United States Patent
Komachi et al.

(10) Patent No.: US 9,929,781 B2
(45) Date of Patent: Mar. 27, 2018

(54) ANTENNA DEVICE

(71) Applicant: TDK Corporation, Tokyo (JP)

(72) Inventors: Toshifumi Komachi, Tokyo (JP); Hirohumi Asou, Tokyo (JP); Toshio Tomonari, Tokyo (JP)

(73) Assignee: TDK CORPORATION, Tokyo (JP)

( * ) Notice: Subject to any disclaimer, the term of this patent is extended or adjusted under 35 U.S.C. 154(b) by 75 days.

(21) Appl. No.: 15/099,046

(22) Filed: Apr. 14, 2016

(65) Prior Publication Data

US 2016/0323019 A1 Nov. 3, 2016

(30) Foreign Application Priority Data

Apr. 28, 2015 (JP) ................. 2015-092039

(51) Int. Cl.
*H01Q 7/06* (2006.01)
*H01Q 7/08* (2006.01)
*H04B 5/00* (2006.01)

(52) U.S. Cl.
CPC ............. *H04B 5/0081* (2013.01); *H01Q 7/08* (2013.01)

(58) Field of Classification Search
CPC ...... H04B 5/0081; H01Q 1/243; H01Q 1/528; H01Q 7/06; H01Q 7/08
See application file for complete search history.

(56) References Cited

U.S. PATENT DOCUMENTS

| | | | | |
|---|---|---|---|---|
| 3,453,634 A * | 7/1969 | Gilbert | ..................... | H01Q 7/08 336/84 R |
| 7,088,304 B2 * | 8/2006 | Endo | .................. | G06K 19/0726 343/788 |
| 8,354,971 B2 * | 1/2013 | Ito | .................... | G06K 19/07749 343/787 |
| 8,698,686 B2 * | 4/2014 | Ito | .................... | G06K 19/07749 343/741 |
| 2012/0262357 A1 | 10/2012 | Kato et al. | | |

FOREIGN PATENT DOCUMENTS

JP 4687832 2/2011

* cited by examiner

*Primary Examiner* — Tho G Phan

(74) *Attorney, Agent, or Firm* — Young Law Firm, P.C.

(57) ABSTRACT

An antenna device is provided with a magnetic core having a winding core and first and second flanges provided at one end and the other end of the winding core, respectively, an antenna coil constituted of a wire wound around the winding core, and a metal layer disposed parallel to a coil axis direction of the antenna coil. The metal layer has a slit overlapped with at least a part of the first flange in a plan view.

17 Claims, 7 Drawing Sheets

ANTENNA DEVICE

BACKGROUND OF THE INVENTION

Field of the Invention

The present invention relates to an antenna device and, more particularly, to an antenna device suitable for NFC (Near Field Communication).

Description of Related Art

In recent years, a mobile electronic device such as a smartphone is equipped with an RFID (Radio Frequency Identification: individual identification by radio waves) system and further equipped with, as a communication means of the RFID, an antenna for performing near field communication with a reader/writer and the like.

Further, the mobile electronic device is provided with a metallic shield so as to protect a built-in circuit from external noise and to prevent unnecessary radiation of noise generated inside the device. Particularly, recently, a housing itself of the mobile electronic device is made of metal instead of resin, considering thinness, light weight, durability against drop impact, design, and the like. Cases where the metallic housing doubles as the metallic shield have been increasing. However, since generally the metallic shield shields electric waves, when an antenna needs to be provided, it is necessary to arrange the antenna at a position not overlapping the metallic shield. When the metallic shield is arranged over a wide range, arrangement of the antenna becomes a serious problem.

To solve the above problem, in antenna devices disclosed in, e.g., Japanese Patent No. 4,687,832, an opening is formed in a metal layer, a slit connecting the opening and an outer edge is formed, and an antenna coil is arranged such that an inner diameter portion of the antenna coil overlaps with the opening of the metal layer. In this configuration, current flows in the metal layer so as to shield a magnetic field generated by flowing of current in a coil conductor, and the current flowing around the opening of the metal layer passes around the slit, with the result that current flows also around the metal layer by edge effect. As a result, a magnetic field is generated also from the metal layer, and the metal layer makes a large loop of a magnetic flux, thereby increasing a communication distance between the antenna device and an antenna of an apparatus at a communication partner side. That is, it is possible to allow the metal layer to function as an accelerator for increasing a communication distance of the antenna coil.

While the above-described antenna device is so-called a planar antenna coil, there is also known a three-dimensional wound-type coil antenna. As compared with the planar coil antenna, the coil antenna of such a type can be increased in inductance more easily, can generate more magnetic lines of force, and can be miniaturized more easily.

However, the wound-type coil antenna has excessively strong directivity. In addition, when the wound-type coil antenna is reduced in size, it cannot generate a large loop magnetic flux that can be interlinked with an opposing antenna. Thus, the wound-type coil antenna has problems for practical use as an antenna for near field communication.

SUMMARY

An object of the present invention is therefore to provide an antenna device configured using a wound-type antenna coil and suitable for near field communication.

To solve the above problem, an antenna device according to the present invention includes: a magnetic core having a winding core and first and second flanges provided at one end and the other end of the winding core, respectively: an antenna coil constituted of a wire wound around the winding core; and a metal layer disposed parallel to a coil axis direction of the antenna coil. The metal layer has a slit overlapped with at least a part of the first flange in a plan view.

According to the present invention, a magnetic flux generated from the antenna coil can be radiated outside the metal layer through the slit and widely circulated around the metal layer. Thus, directivity of a wound-type antenna coil can be widened, whereby it is possible to realize antenna characteristics suitable for near field communication.

In the present invention, the second flange is preferably covered by the metal layer. With this configuration, directivity of the antenna coil can be widened, and a communication distance from an opposing antenna can be increased.

In the present invention, the metal layer preferably has a notch formed in a region overlapped with at least a part of the second flange in a plan view. With this configuration, although widening of the directivity of the antenna coil is still reduced, a communication distance in a direction perpendicular to the metal layer can further be increased, whereby balance between the widening of the directivity and the communication distance can be improved.

In the present invention, a distance from an end surface of the first flange that is opposed to the metal layer to the metal layer is preferably smaller than a distance from an end surface of the second flange that is opposed to the metal layer to the metal layer. When the first flange is closer to the metal layer than the second flange is, a magnet flux can be made to easily pass through the slit, whereby a communication distance can be increased.

In the present invention, it is preferable that the antenna coil is provided in a casing of a mobile electronic device, and the metal layer constitutes at least a part of the casing. When the casing of the mobile electronic device, in which the antenna device is incorporated, is formed of the metal layer, durability and designability of the mobile electronic device can be improved; however, the antenna device cannot perform communication due to a shield effect of the metal layer. According to the present invention, however, such a problem can be solved and, in addition, radiation characteristics can be improved.

It is preferable that the antenna device according to the present invention further includes a printed circuit board provided in the casing, and the antenna coil and the magnetic core constitute a coil component surface-mounted on the printed circuit board. With this configuration, like other electronic components constituting the mobile electronic device, the antenna coil can be surface-mounted on the printed circuit board, whereby the antenna coil can be easily installed in the casing.

According to the present invention, it is possible to provide an antenna device having wide directivity and suitable for near field communication even when the wound-type coil antenna is adopted.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE EMBODIMENTS

Preferred embodiments of the present invention will be explained below in detail with reference to the accompanying drawings.

Figure 1:
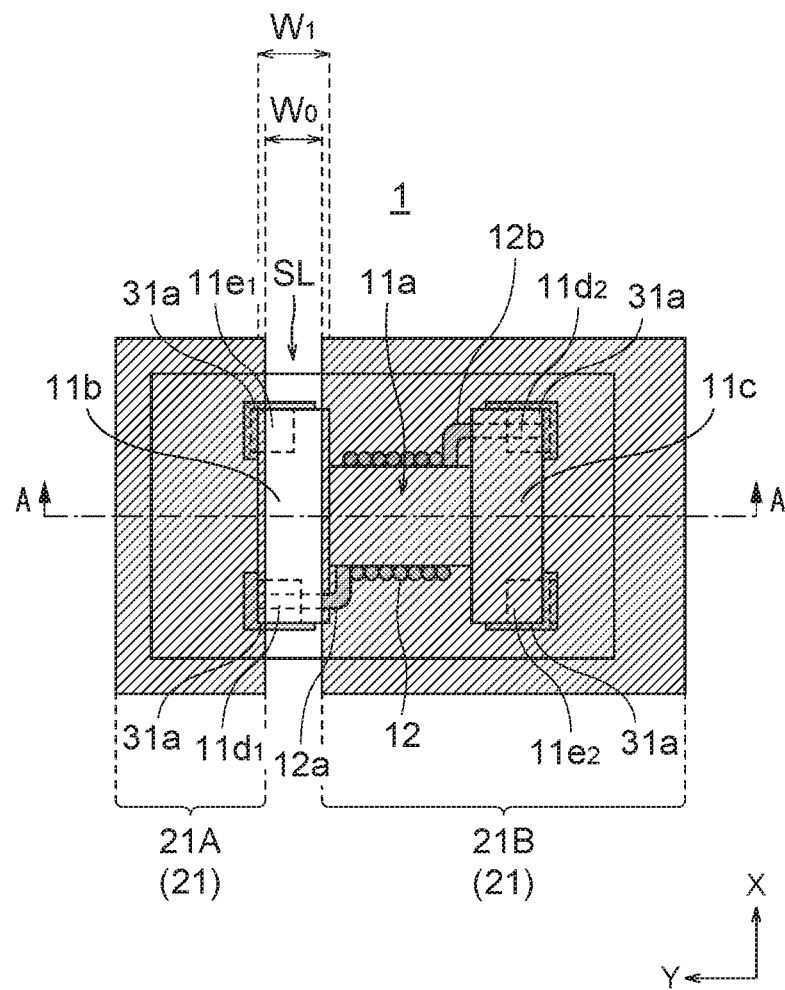
FIG. 1 is a schematic plan view transparently illustrating a configuration of an antenna device according to a first embodiment of the present invention.
Figure 2:
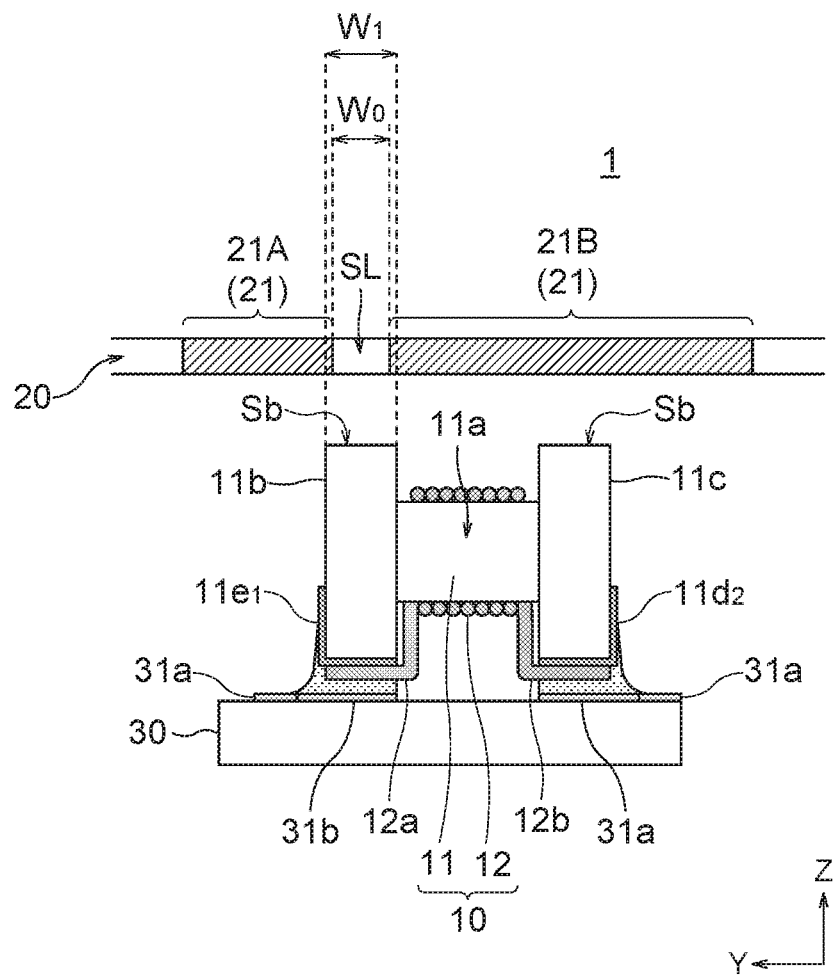
FIG. 2 is a schematic cross-sectional side view of the antenna device taken along a line A-A of FIG. 1.

FIG. 1 is a schematic plan view transparently illustrating a configuration of an antenna device according to a first embodiment of the present invention, and FIG. 2 is a schematic cross-sectional side view of the antenna device taken along a line A-A of FIG. 1.

As illustrated in FIGS. 1 and 2, an antenna device 1 has a wound-type antenna coil 12 wound around a drum-shaped magnetic core 11 and a metal layer 21 covering from above the antenna coil 12. The magnetic core 11 and the antenna coil 12 constitute a surface-mountable wound-type coil component 10. The metal layer 21 constitutes a casing 20 of a mobile electronic device and is disposed substantially parallel to a coil axis (Y-axis) of the antenna coil 12. It is assumed that the metal layer 21 side is positioned above the antenna coil 12, and a side opposite to the metal layer 21 is positioned below the antenna coil 12.

The magnetic core 11 has a winding core 11a and a pair of flanges 11b and 11c provided at one and the other ends of the winding core 11a. A center axis direction of the winding core 11a is a Y-axis direction. The magnetic core 11 is disposed inside the casing 20 of a mobile electronic device such that each upper end surface of one and the other flanges 11b and 11c (first and second flanges) are positioned at the metal layer 21 side and each lower end surface of one and the other flange 11c (second flange) is positioned at a side opposite to the metal layer 21. A size (length, width and height dimensions) of the magnetic core 11 can be set to, e.g., 2 mm×2 mm×2 mm.

The antenna coil 12 is so-called a helical antenna and has a three-dimensional winding structure wound around the winding core 11a of the magnetic core 11. The number of turns of the antenna coil 12 is not especially limited and appropriately be set in accordance with desired antenna characteristics. A planar size of the wound-type antenna coil can be reduced more than an antenna coil having a planar coil pattern, whereby miniaturization and space saving of the antenna device can be achieved.

In the present embodiment, the coil component 10 is mounted on a printed circuit board 30 in the casing 20. One end 12a of the antenna coil 12 is connected to a signal terminal $11d_1$ provided on the first flange 11b of the magnetic core 11, and the other end 12b of the antenna coil 12 is connected to a signal terminal $11d_2$ provided on the second flange 11c of the magnetic core 11. The first and second flanges 11b and 11c are also provided with dummy terminals $11e_1$ and $11e_2$ for soldering, respectively. The four terminals ($11d_1$, $11d_2$, $11e_1$, and $11e_2$) are soldered to four lands 31a on the printed circuit board 30 and, thereby, the magnetic core 11 is mechanically fixed to the printed circuit board 30. The both ends (12a and 12b) of the antenna coil 12 are connected to an NFC chip (not illustrated) mounted on the printed circuit board 30 through the pair of signal terminals $11d_1$ and $11d_2$, respectively.

The metal layer 21 has a slit SL overlapped with the first flange 11b in a plan view. The slit SL is a straight line-shaped region interposed between first and second metal surfaces 21A and 21B in the metal layer 21. The slit SL straightly extends in an X-direction with a constant width to separate the first and second metal surfaces 21A and 21B from each other. A width $W_0$ of the slit SL may be equal to, smaller than, or larger than a width $W_1$ of the first flange 11b in the same direction (Y-direction) as the width direction of the slit SL. However, the width $W_1$ of the first flange 11b is, preferably, equal to or less than 5 times, more preferably, equal to or less than 2 times of the width $W_0$ of the slit SL. Preferably, the slit SL is overlapped with the entire part of the first flange 11b; however, it may be partially overlapped with the first flange 11b.

As described above, when the casing 20 of the mobile electronic device is formed of the metal layer 21, durability and designability of the mobile electronic device can be improved; however, the antenna coil 12 in the casing 20 is covered by the metal layer 21 and, therefore, communication using the antenna coil 12 is disabled due to a shield effect of the metal layer 21. In the present embodiment, however, formation of the slit SL in the metal layer 21 allows a magnetic flux to be radiated outside the metal layer 21. In addition, directivity of the antenna coil 12 can be improved by using the metal layer 21.

Figure 3:
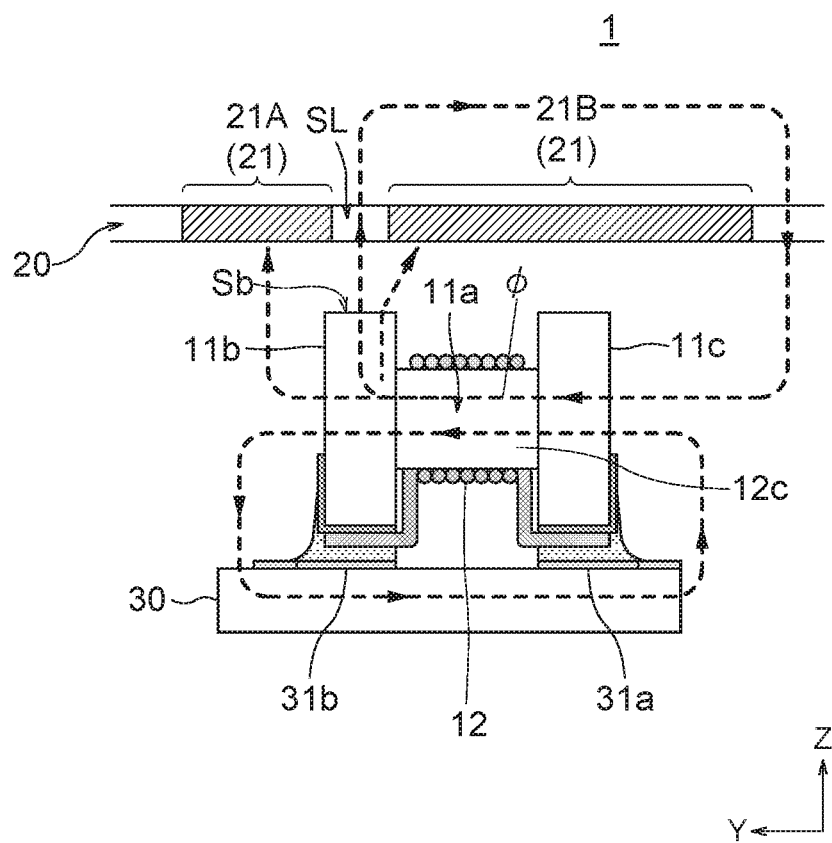
FIG. 3 is a schematic cross-sectional view for explaining an action of the metal layer 21 and the slit SL on the antenna coil 12.

FIG. 3 is a schematic cross-sectional view for explaining an action of the metal layer 21 and the slit SL on the antenna coil 12.

As illustrated in FIG. 3, when a current flows in the antenna coil 12, a magnetic flux φ penetrating an inner diameter portion 12c of the antenna coil 12 is generated. This magnetic flux φ forms a loop extending from, e.g., the first flange 11b side, passing through an outside of the antenna coil 12, to the second flange 11c. At this time, a part of the magnetic flux φ is made incident on the first and second metal surfaces 21A and 21B, and a current in a direction canceling the magnetic flux flows in each of the metal surfaces 21A and 21B. This current becomes an eddy current by an edge effect.

When the slit SL is formed in the metal layer 21, another part of the magnetic flux φ that is interlinked with the antenna coil 12 is emitted upward from an upper end surface Sb of the first flange 11b, passing through the slit SL interposed between the first and second metal surfaces 21A and 21B, and is radiated outside the metal layer 21. The magnetic flux φ that has passed through the slit SL attempts to widely circulate around each of the first and second metal surfaces 21A and 21B by advancing along a path starting from the slit SL toward an outer edge the second metal surface 21B. As a result, the magnetic flux φ draws a large loop to be magnetically coupled with an antenna coil of a reader/writer. Particularly, since a planar size of the second metal surface 21B is made sufficiently larger than a planar size of the antenna coil 12, a larger loop magnetic field can be generated, whereby the directivity of the antenna coil 12 can be widened.

The wound-type antenna coil 12 has sharp directivity, so that it is easy to increase a communication distance thereof in the coil axis direction. However, the antenna coil 12 has a small spread of radiowaves and was difficult to use as an antenna for near field communication. To cope with this, the directivity can be widened by using the metal layer 21 constituting the casing 20 that houses the antenna coil 12, thereby allowing the antenna coil 12 to be used for near field communication. Particularly, by making the coil axis direction substantially parallel to the metal layer 21 and by disposing the coil component 10 such that the first flange 11b is overlapped with the slit SL of the metal layer 21 in a plan view, it is possible to widen directivity while ensuring a sufficient communication distance in a direction perpendicular to the metal layer 21.

When the coil axis of the wound-type antenna coil 12 is made substantially parallel to the metal layer 21, directivity in a direction parallel to the metal layer 21 becomes strong, while directivity in a Z-axis direction perpendicular to the metal layer 21 becomes weak, thus shortening a communication distance in the Z-axis direction. However, in the present embodiment, a part of the magnetic flux that leaks in the Z-direction from the upper end surface Sb of the first flange 11b of the magnetic core 11 passes through the slit SL to be delivered outside the metal layer 21, so that it is possible to strengthen the directivity in the Z-direction by a boosting effect of the first and second metal surfaces 21A and 21B, whereby a communication distance can be increased.

As described above, according to the antenna device 1 of the present embodiment, a magnetic flux generated from the antenna coil 12 can be radiated outside the metal layer 21 and then circulated widely around the metal layer 21. Thus, it is possible to widen the directivity of the antenna coil 12 to thereby realize antenna characteristics suitable for near field communication.

Further, in the present embodiment, the surface-mountable wound-type coil component 10 is used. Thus, production and handling of the coil component 10 is easy. Further, the coil component 10 can be surface-mounted on the printed circuit board 30, whereby the antenna coil 12 can be easily installed in the casing 20. Further, the first flange 11b functions as a magnetic path for the magnetic flux interlinked with the antenna coil 12 and converges the magnetic flux to guide it to the slit SL, allowing as much of the magnetic flux as possible to be radiated outside the metal layer 21, which can improve antenna characteristics.

Figure 4:
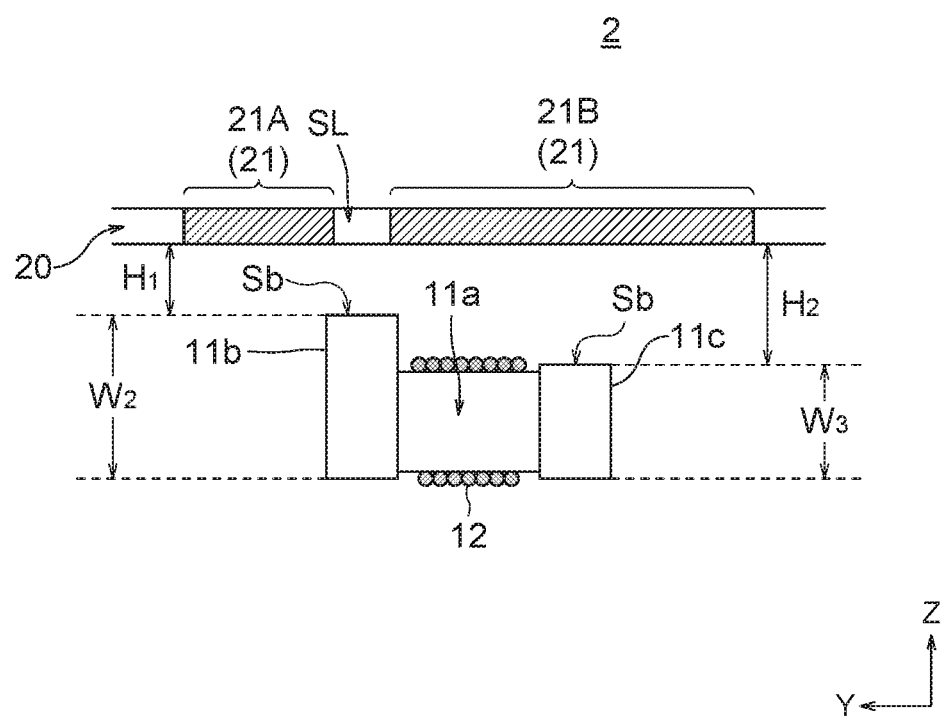
FIG. 4 is a schematic cross-sectional view illustrating a configuration of an antenna device according to a second embodiment of the present invention.

FIG. 4 is a schematic cross-sectional view illustrating a configuration of an antenna device according to a second embodiment of the present invention.

As illustrated in FIG. 4, an antenna device of the present embodiment is featured in that a distance $H_1$ from the upper end surface Sb of the first flange 11b that is opposed to the metal layer 21 to the metal layer 21 is smaller than a distance $H_2$ from the upper end surface Sb of the second flange 11c to the metal layer 21. To realize such a configuration, in the present embodiment, a width $W_3$ of the second flange 11c in the Z-direction perpendicular to an extending direction (X-direction) of the slit SL is made smaller than a width $W_2$ of the first flange 11b in the Z-direction. Other configurations are the same as those of the first embodiment.

When the distance $H_1$ from the upper end surface Sb of the first flange 11b to the slit SL is small, much of the magnetic flux φ emitted from the first flange 11b can be delivered into the slit SL, whereby a communication distance in a direction perpendicular to the metal layer 21 can be increased. On the other hand, when the distance $H_2$ from the upper end surface Sb of the second flange 11c to the slit SL is large, it is possible to suppress influence that the metal layer 21 has on the magnetic flux $φ_1$ passing through the second flange 11c and interlinked with the antenna coil 12, whereby deterioration of the antenna characteristics can be avoided.

Figure 5:
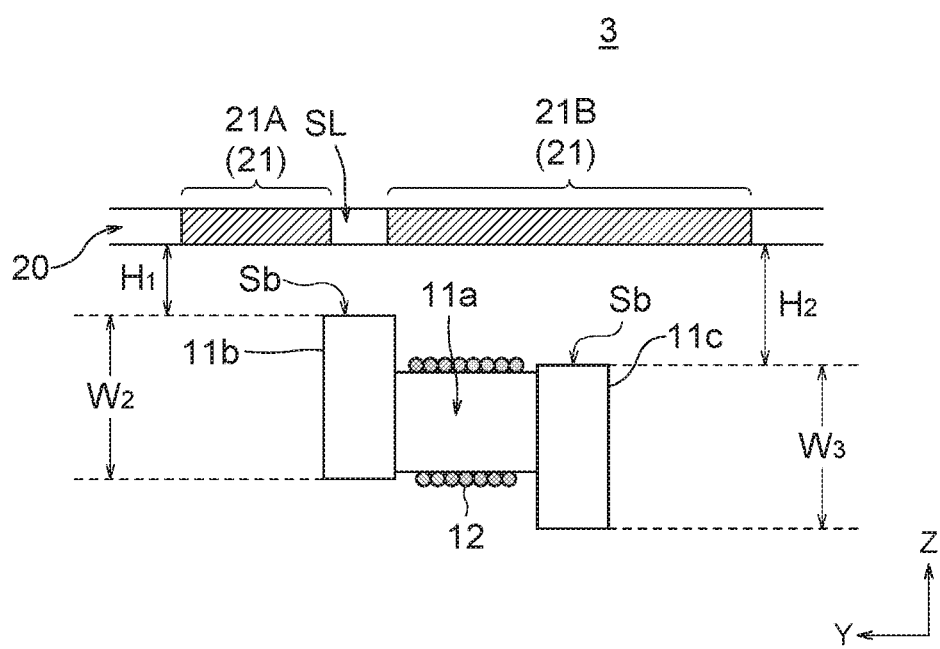
FIG. 5 is a schematic cross-sectional view illustrating a configuration of an antenna device according to a third embodiment of the present invention.

FIG. 5 is a schematic cross-sectional view illustrating a configuration of an antenna device according to a third embodiment of the present invention.

As illustrated in FIG. 5, an antenna device 3 of the present embodiment is featured in that, as in the case of the second embodiment, the distance $H_1$ from the upper end surface Sb of the first flange 11b that is opposed to the metal layer 21 to the metal layer 21 is smaller than the distance $H_2$ from the upper end surface Sb of the second flange 11c to the metal layer 21. However, the third embodiment differs from the second embodiment in that the first flange 11b and the second flange 11c have the same size and in a flange mounting position with respect to the winding core 11a. The first flange 11b is mounted to the winding core 11a in a deviated way such that the upper end surface Sb relatively comes close to the metal layer 21 and, conversely, the second flange 11c is mounted to the winding core 11a in a deviated way such that the upper end surface Sb relatively separates away from the metal layer 21. With this configuration, the present embodiment can provide the same effects as those obtained by the second embodiment.

Figure 6:
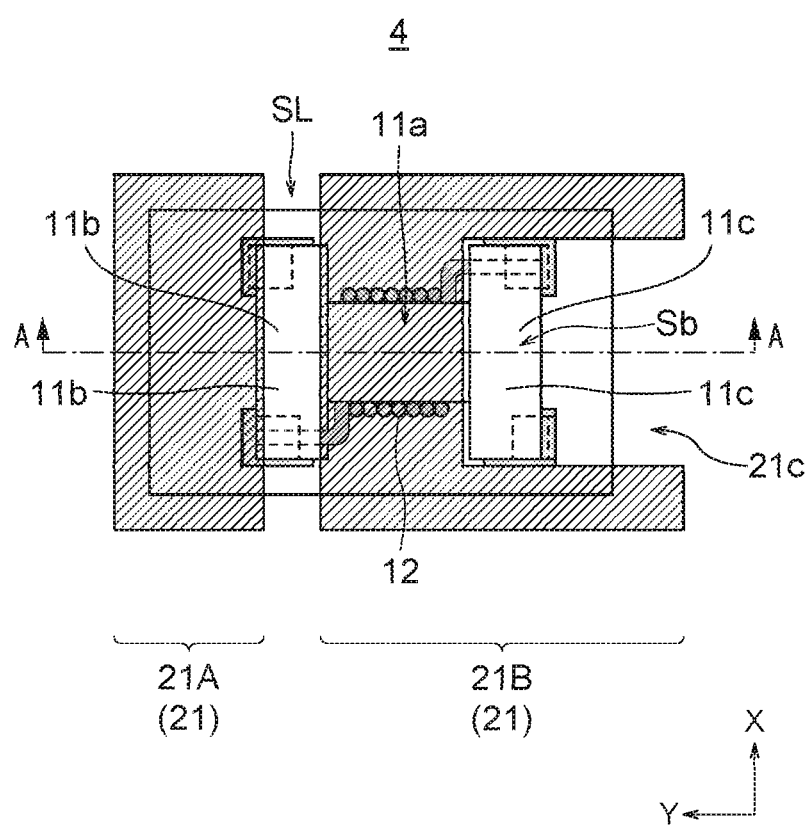
FIG. 6 is a schematic cross-sectional view illustrating a configuration of an antenna device according to a fourth embodiment of the present invention.

FIG. 6 is a schematic cross-sectional view illustrating a configuration of an antenna device according to a fourth embodiment of the present invention.

As illustrated in FIG. 6, an antenna device 4 according to the present embodiment is featured as follows. That is, a notch 21c is formed in the metal surface 21B of the metal layer 21 so as to be overlapped with at least a part of the second flange 11c, with the result that the second flange 11c is exposed from the notch 21c. Other configurations are the same as those of the first embodiment.

According to the present embodiment, the upper end surface Sb of the second flange 11c is not covered by the metal surface 21B but exposed, so that it is possible to deliver the magnetic flux φ that has passed through the upper end surface Sb of the second flange 11c outside the metal layer 21. As a result, although widening of the directivity is reduced a little, a communication distance in the Z-direction can further be increased, whereby balance between the widening of the directivity and the communication distance can be improved.

Figure 7:
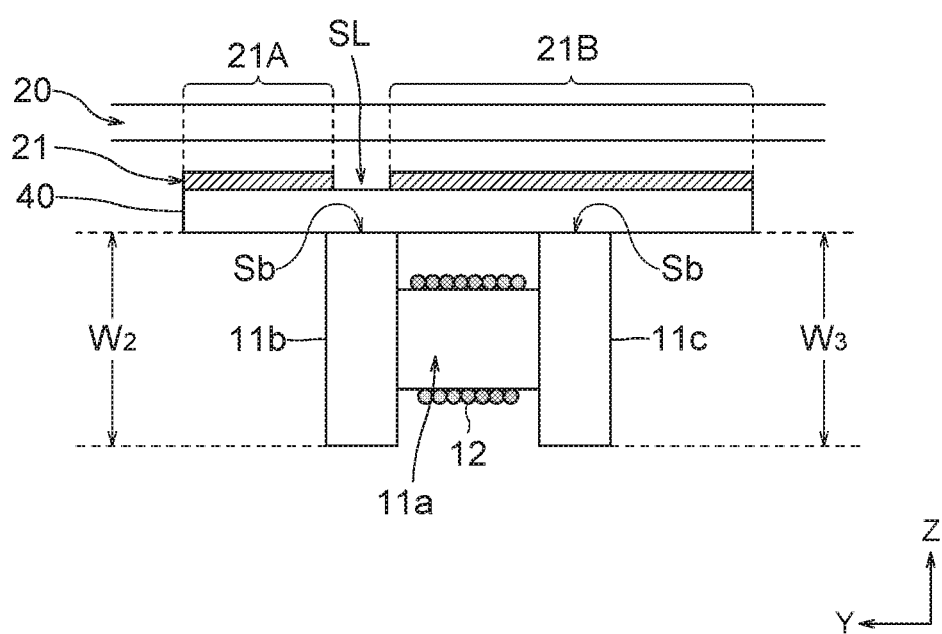
FIG. 7 is a schematic cross-sectional view illustrating a configuration of an antenna device according to a fifth embodiment of the present invention.

FIG. 7 is a schematic cross-sectional view illustrating a configuration of an antenna device according to a fifth embodiment of the present invention.

As illustrated in FIG. 7, an antenna device 5 of the present embodiment is featured in that the metal layer 21 is not formed on a constituent element of the casing 20, but formed on a substrate 40 on which the coil component 10 is mounted. The substrate 40 is provided in the casing 20, and the metal layer 21 is formed on one main surface of the substrate 40 that is opposed to the casing 20. The coil component 10 is fixed onto the other main surface of the substrate 40. In the present embodiment, the upper end surfaces Sb of the first and second flanges 11b and 11c are fixedly bonded onto a surface of the substrate 40 by, e.g., adhesive. Alternatively, the upper end surfaces Sb of the first and second flanges 11b and 11c may be soldered onto the surface of the substrate 40 as in the first embodiment. With this configuration, the present embodiment can provide the same effects as those obtained by the first embodiment.

It is apparent that the present invention is not limited to the above embodiments, but may be modified and changed without departing from the scope and spirit of the invention.

What is claimed is:

1. An antenna device comprising:
   a magnetic core having a winding core and first and second flanges provided at one end and the other end of the winding core, respectively;
   an antenna coil having a wire wound around the winding core; and
   a metal layer disposed substantially parallel to a coil axis direction of the antenna coil,
   wherein the metal layer has a slit overlapped with at least a part of the first flange in a plan view.

2. The antenna device as claimed in claim 1, wherein the second flange is covered by the metal layer.

3. The antenna device as claimed in claim 1, wherein the metal layer further has a notch formed in a region overlapped with at least a part of the second flange in a plan view.

4. The antenna device as claimed in claim 1, wherein a first distance from an end surface of the first flange that is opposed to the metal layer to the metal layer is smaller than a second distance from an end surface of the second flange that is opposed to the metal layer to the metal layer.

5. The antenna device as claimed in claim 1, wherein
   the antenna coil is provided in a casing of a mobile electronic device, and
   the metal layer constitutes at least a part of the casing.

6. The antenna device as claimed in claim 5 further comprising a printed circuit board provided in the casing,
   wherein the antenna coil and the magnetic core constitute a coil component surface-mounted on the printed circuit board.

7. An antenna device comprising:
   a printed circuit board having a main surface;
   a coil component mounted on the main surface of the printed circuit board, the coil component including a first flange, a second flange, a winding core located between the first and second flanges, and an antenna coil wound around the winding core, the antenna coil defining a coil axis that is substantially parallel to the main surface of the printed circuit board; and
   first and second metal layers arranged substantially parallel to the main surface of the printed circuit board so that a slit is formed between the first and second metal layers,
   wherein the slit exposes at least a part of the first flange.

8. The antenna device as claimed in claim 7, wherein the first and second flanges are coplanar.

9. The antenna device as claimed in claim 7, wherein the slit extends in a first direction that is substantially perpendicular to the coil axis.

10. The antenna device as claimed in claim 7, wherein a width of the slit in a second direction substantially parallel to the coil axis is smaller than a width of the first flange in the second direction.

11. The antenna device as claimed in claim 7, wherein a width of the slit in a second direction substantially parallel to the coil axis is greater than a width of the first flange in the second direction.

12. The antenna device as claimed in claim 7, wherein the first and second flanges are different in size from each other.

13. The antenna device as claimed in claim 7, wherein the first flange has a greater height than the second flange from the main surface of the printed circuit board.

14. The antenna device as claimed in claim 7, wherein the first and second metal layers are different in size from each other.

15. The antenna device as claimed in claim 7, wherein the second metal layer covers the winding core without covering at least a part of the second flange.

16. An antenna device comprising:
    a printed circuit board having a main surface;
    a coil component mounted on the main surface of the printed circuit board, the coil component including a first flange, a second flange, a winding core located between the first and second flanges, and an antenna coil wound around the winding core, the antenna coil defining a coil axis that is substantially parallel to the main surface of the printed circuit board; and
    a metal layer that is arranged substantially parallel to the main surface of the printed circuit board and that entirely covers the second flange,
    wherein the metal layer covers the winding core without covering at least a part of the first flange.

17. The antenna device as claimed in claim 16, wherein the first flange has a greater height than the second flange from the main surface of the printed circuit board.

* * * * *